(12) United States Patent
Iversen (10) Patent No.: US 9,982,199 B2
(45) Date of Patent: *May 29, 2018

(54) METHOD FOR PREPARING START UP OF PROCESS AND EQUIPMENT FOR PRODUCING LIQUID HYDROCARBONS

(71) Applicant: STEEPER ENERGY APS, Hørsholm (DK)

(72) Inventor: Steen Brummerstedt Iversen, Vedbæk (DK)

(73) Assignee: STEEPER ENERGY APS, Hørsholm (DK)

( * ) Notice: Subject to any disclaimer, the term of this patent is extended or adjusted under 35 U.S.C. 154(b) by 554 days.

This patent is subject to a terminal disclaimer.

(21) Appl. No.: 14/417,952

(22) PCT Filed: Aug. 29, 2013

(86) PCT No.: PCT/DK2013/000057
§ 371 (c)(1),
(2) Date: Jan. 28, 2015

(87) PCT Pub. No.: WO2014/032671
PCT Pub. Date: Mar. 6, 2014

(65) Prior Publication Data
US 2015/0210933 A1    Jul. 30, 2015

(30) Foreign Application Priority Data

Aug. 30, 2012  (DK) .................................. 2012 00533

(51) Int. Cl.
*C10G 3/00* (2006.01)
*C10G 1/00* (2006.01)
*C10G 1/06* (2006.01)

(52) U.S. Cl.
CPC ............. *C10G 3/52* (2013.01); *C10G 1/008* (2013.01); *C10G 1/065* (2013.01); *C10G 3/40* (2013.01); *C10G 3/50* (2013.01); *C10G 3/60* (2013.01); *C10G 2300/4031* (2013.01); *C10G 2300/42* (2013.01); *C10G 2300/805* (2013.01); *Y02P 30/20* (2015.11)

(58) Field of Classification Search
CPC ............ C10G 31/08; C10G 2300/4006; C10G 2300/4012; C10G 31/06
USPC ......... 700/273, 272, 301, 299; 436/155, 157
See application file for complete search history.

(56) References Cited

U.S. PATENT DOCUMENTS

| 1,890,434 A | 12/1932 | Krauch et al. |
| 3,642,607 A | 2/1972 | Seitzer |
| 4,021,329 A | 5/1977 | Seitzer |
| 4,266,083 A | 5/1981 | Huang |
| 4,935,567 A | 6/1990 | Yokoyama et al. |
| 5,425,814 A | 6/1995 | Krajicek et al. |
| 6,132,478 A | 10/2000 | Tsurui et al. |
| 7,262,331 B2 | 8/2007 | Van De Beld et al. |

(Continued)

FOREIGN PATENT DOCUMENTS

| EP | 0 073 355 A1 | 3/1983 |
| EP | 0 204 354 A1 | 12/1986 |

(Continued)

OTHER PUBLICATIONS

Lissens et al., "Advanced anaerobic bioconversion of lignocellulosic waste for bioregenerative life support following thermal water treatment and biodegradation by Fibrobacter succinogenes", Biodegradation, vol. 15, 2004, pp. 173-183.

(Continued)

*Primary Examiner* — Natalia Levkovich
(74) *Attorney, Agent, or Firm* — Birch, Stewart, Kolasch & Birch, LLP (57) ABSTRACT

The invention relates to a process for continuously converting carbonaceous material contained in one or more feedstocks into a liquid hydrocarbon product, said feedstocks including the carbonaceous material being in a feed mixture including one or more fluids, said fluids including water, the process comprising: converting at least part of the carbonaceous material by pressurising the feed mixture to an operational pressure in the range 150-400 bar, heating the feed mixture to an operational temperature in the range 300-450° C., and maintaining said pressurized and heated feed mixture in the desired pressure and temperature ranges in a reaction zone for a predefined time; cooling the feed mixture to a temperature in the range 25-200° C. and expanding the feed mixture to a pressure in the range of 1-70 bar, thereby causing the carbonaceous material to be converted to a liquid hydrocarbon product; and separating from the converted feed mixture a fraction comprising liquid hydrocarbon product; where prior to the pressurisation and heating of the feed mixture the system has been brought to an operational state by filling the system with a fluid while the system being at a temperature and a pressure below the operational temperature and pressure, and subsequently heating and pressurizing the fluid to the operational conditions at a predetermined heating and pressurisation rate, where the pressure is constantly kept at a level above the saturation pressure for the fluid at a given temperature; and where upon reaching the operational temperature and pressure the fluid inflow to the pressurisation is terminated and the feed mixture inflow to the pressurisation is initiated.

19 Claims, 4 Drawing Sheets

(56) References Cited

U.S. PATENT DOCUMENTS

| | | |
|---|---|---|
| 2004/0194383 A1 | 10/2004 | Wheat et al. |
| 2007/0264175 A1* | 11/2007 | Iversen .............. B01D 11/0203 422/235 |
| 2008/0184880 A1 | 8/2008 | Fan et al. |
| 2008/0276800 A1 | 11/2008 | Lourenco et al. |
| 2009/0126274 A1 | 5/2009 | Vogel et al. |
| 2009/0206007 A1 | 8/2009 | Allam |
| 2010/0256430 A1 | 10/2010 | Bathurst |
| 2010/0287825 A1 | 11/2010 | Humphreys |

FOREIGN PATENT DOCUMENTS

| | | | |
|---|---|---|---|
| EP | 2 287 279 | A1 | 2/2011 |
| WO | WO 81/00855 | A1 | 4/1981 |
| WO | WO 95/14850 | A1 | 6/1995 |
| WO | 2004/087619 | A2 | 10/2004 |
| WO | 2006/117002 | A2 | 11/2006 |
| WO | 2009/015409 | A1 | 2/2009 |
| WO | WO 2009/099684 | A2 | 8/2009 |
| WO | WO 2010/014010 | A2 | 2/2010 |
| WO | WO 2011/069510 | A1 | 6/2011 |
| WO | WO 2012/092644 | A1 | 7/2012 |

OTHER PUBLICATIONS

Hammerschmidt et al., "Catalytic conversion of waste biomass by hydrothermal treatment", Fuel, vol. 90, 2011 (Available online Oct. 20, 2010), pp. 555-562.

Karagoz et al., "Comparative studies of oil compositions produced from sawdust, rice husk, lignin and cellulose by hydrothermal treatment", Fuel, vol. 84, 2005 (Available online Jan. 19, 2005), pp. 875-884.

Osada et al., "Catalytic Gasification of Wood Biomass in Subcritical and Supercritical Water", Combust. Sci. and Tech., vol. 178, 2006, pp. 537-552.

Peterson et al., "Thermochemical biofuel production in hydrothermal media: A review of sub- and supercritical water technologies", Energy Environ. Sci., vol. 1, 2008 (published online Jul. 9, 2008), pp. 32-65.

DOE Fundamentals Handbook, vol. 2/2, Jan. 1993, pp. 11-13.

Luft, G., Maier, S., "Safety and Control in High Pressure Plant Design and Operation," High Pressure Process Technology: Fundamentals and Applications, edited by A. Bertucco and G. Vetter, vol. 9, Elsevier, 2001, pp. 405-406.

Matsumura et al. "Co-liquefaction of coal and cellulose in supercritical water", Fuel, vol. 78, Issue 9, Jul. 1999, pp. 1049-1056.

Outland, J.S., "Applications of Mechanical Vapor Recompression to Evaporation and Crystallization," Proceedings from the Seventeenth Industrial Energy Technology Conference, Houston, TX (Apr. 5-6, 1995); pp. 67-70.

Sinnott, R.K.; "Chemical Engineering Design"; 4th ed.; Elsevier; Oxford (2005), p. 101.

United States Environmental Protection Agency, "Sugar Cane Processing" [online], Jun. 1997 (retrieved on Aug. 20, 2015), retrieved from the Internet: <URL:http://www.epa.gov/ttn/chief/ap42/ch09/final/c9s10-1a.pdf>.

U.S. Appl. No. 14/417,956, filed Jan. 28, 2015.
U.S. Appl. No. 14/417,933, filed Jan. 28, 2015.
U.S. Appl. No. 14/125,177, filed Dec. 10, 2013.

* cited by examiner

METHOD FOR PREPARING START UP OF PROCESS AND EQUIPMENT FOR PRODUCING LIQUID HYDROCARBONS

FIELD OF THE INVENTION

The present invention relates to the field of producing liquid hydrocarbons from carbonaceous materials. In particular, it relates to an improved process and apparatus for doing so in an efficient, economical and environmentally sustainable way.

BACKGROUND OF THE INVENTION

The world is facing fluctuations in crude oil prices as well as challenges to energy security, economic stability and growth. Further environmental concerns related to climate change due to the 'greenhouse effect' is coming more and more in focus. Furthermore a number of conventional energy sources such as oil are being depleted. This calls for a more efficient and sustainable use of resources, including non-conventional and alternative resources.

Hence, there is a large and increasing global interest in new technologies for the production of liquid hydrocarbons from low value abundant resources such as lignite, peat, biomass, residues and waste. A general characteristic of such low value resources is that they typically have high moisture content, an oxygen content on a dry ash free basis in the range 20-60%, and an ash content ranging from a few percent to more than 50% by weight, which results in a low heating value as received.

Technologies for production nonconventional liquid hydrocarbons are known e.g. production of liquid hydrocarbons from coal has been known for more than 150 years. Pyrolysis or high temperature carbonization is another well known route for production of liquid hydrocarbons from solid fuel. Depending on the specific process the input stream may be heated to a temperature in the range 450 to 1000° C. in the absence of oxygen, driving of the volatile compounds and leaving a coke product. The hydrocarbon yields can be wide varying and ranges from 10 to 75% depending on the volatile content of the specific input streams and process conditions. In general fast heating (fast pyrolysis) and short residence time provides the highest yields. However, pyrolysis is limited to dry input streams e.g. moisture contents up to approximately 10% by weight. Further as only very limited conversion of the liquid hydrocarbon produced occurs during processing, the liquid hydrocarbons produced have a high oxygen and water content, and the liquid hydrocarbons produced consequently have a low heating value. Further, the liquid hydrocarbons are not mixable with petrodiesel and petrocrude, and are corrosive and susceptible to polymerization which makes long term storage difficult. This limits the direct use of such pyrolytic hydrocarbon liquids. Upgrading of pyrolytic hydrocarbons may be performed by hydrodeoxygenation or by addition of hydrogen during the pyrolysis process. However, though such hydrogenation processes are technically feasible, they will add significantly to the production costs as no oxygen is removed by the pyrolysis, and production of hydrogen is relatively expensive.

The production of liquid hydrocarbons from feedstock other than coal is also being conducted by the pyrolysis, as well as by indirect and direct liquefaction techniques described above. However, common for them are that they all require relatively dry input streams. A fundamental issue is difference in the stoichiometry of the input stream and liquid hydrocarbon fuels. For example dry wood may be represented by the formula $CH_{1.4}O_{0.7}$, whereas liquid hydrocarbon fuels may be represented by the formula $CH_2$:

$$CH_{1.4}O_{0.7} \rightarrow CH_2$$

This fundamentals result in an indispensable need for hydrogen addition and/or removal of carbon during the processing for adaption of the H/C ratio and removal of oxygen. Removal of carbon as char and $CO_2$ reduces the maximum obtainable yields of the desired hydrocarbons, whereas production of hydrogen is relatively expensive and adds significantly to the complexity and reduces the efficiency of such processes. Hence to be viable such processes require a very large scale and thereby become very capital intensive (UK DTI, Coal Liquefaction, Cleaner Coal Programme, Technology Status Report 010, October 1999).

Hence, there is a large interest in developing improved production techniques for liquid hydrocarbons not suffering from the drawbacks described above. Conversion of the feedstock in pressurized water at elevated temperatures is a route which has attracted significant attention over recent decades. Such techniques are generally called hydrothermal processing, and generally convert the feedstock into a liquid hydrocarbon product, a char product, a water phase comprising water soluble organics, a gas and a mineral product.

An advantage of hydrothermal processing is that water is kept under pressure so that it is maintained in its liquid and/or supercritical state which means that no phase transition into steam occurs during processing. Hence, the energy loss, in the form of latent heat of evaporation, need not be supplied, and thus energy consuming processes such as evaporation or distillation are eliminated. This renders such processes very energy efficient particularly for wet input streams.

Water, in the vicinity of its critical point (374° C., 221 bar) obtains physical properties which are very different from water at ambient conditions e.g. the dissociation product of water is more than three orders of magnitude higher, it changes its polarity from a polar solvent to a non-polar solvent, interphase mass and heat transfer resistances are significantly reduced and mass- and heat transfer rates are therefore enhanced.

Due to these properties of water in the vicinity of its critical point, water may serve both as a reaction medium, a catalyst for acid and base catalyzed reactions and as a reactant and source of hydrogen in the conversion process.

Hence hydrothermal processing holds the potential to reduce the oxygen content of wet oxygenated feedstock with lower parasitic energy losses and with less hydrogen required due to formation of hydrogen in situ.

Deoxygenation goes through dehydration, decarboxylation and hydrogenation reactions. However, the reaction pathways are complex and are to a large extent unknown except for simple molecules. Carbonaceous macromolecules may undergo various reactions including hydrolysis, dehydration, decarboxylation, steam reforming, water gas shift, steam cracking, Bouduard reaction, hydrogenation, methanation, Fischer-Tropsch, aldol condensation, esterification, methanol synthesis etc. The rate of the individual reactions and the extent to which conversion proceeds via specific reaction pathways depends on a number of factors.

Processes differ in the specific operating conditions and process design and layout being applied e.g. the feedstock, the dry solid content in the feed, the ash content of the feed, the operating pressure and temperature, the pH, the catalysts and other additives present in different parts of the process, the residence time in the different parts of the process, the heat integration, the separation techniques applied including further product handling and upgrading etc.

Despite that hydrothermal technologies have many potential benefits over conventional methods of processing biomass and other organic macromolecules to useful fuels and chemicals, the fact remains that these technologies have yet not been being widely commercialized (A. Peterson et al, 2008).

An improved process and apparatus for production of liquid hydrocarbons as the main product and not suffering from the problems and disadvantages described above is disclosed by Iversen in PCT/DK2012/000071.

Such continuos production plants are connected with significant investments and the profitability of running a plant is highly dependent on the availability of the plant for production. Down time of any kind is therefore highly undesirable, but not totally avoidable as repair and maintenance always will be part of the operation.

In the start up phase of such processes the challenge of getting from a state of pressure and temperature that may be atmospheric conditions, to the high pressure and high temperature operating conditions, present a particular significant challenge when dealing with biomass and similar materials. Most prior process examples are batch processes, where the continuity of the process is of little or no significance. For a continuous process the ability of actually operating uninterrupted is a key parameter for success. The invention therefore aims at the start up phase of such continuously operating processes and the plants performing such processes.

The closest prior art in relation to such processes is known from AIChE Journal January 1995, Vol. 41, No. 1. The previously known method relates to start up of continuously operated chemical plants under adiabatic conditions. The prior reference does however not disclose anything about the startup of a system or a plant for production of hydrocarbon from carboneous material.

Accordingly, it is an object of the invention to provide an improved process for the operation of a plant or apparatus for the production of liquid hydrocarbon, and further to provide an improved apparatus for the production of liquid hydrocarbon, where the availability of the process and the apparatus is improved.

SUMMARY OF THE INVENTION

According to the invention the objective is achieved by a method for preparing a process system for performing a continuos process for converting carbonaceous material contained in one or more feedstocks into a liquid hydrocarbon product, said feedstocks including the carbonaceous material being in a feed mixture including one or more fluids, said fluids including water, the process comprising:
  converting at least part of the carbonaceous material by:
    pressurising the feed mixture to an operational pressure in the range 150-400 bar
    heating the feed mixture to an operational temperature in the range 300-450° C., and
    maintaining said pressurized and heated feed mixture in the desired pressure and temperature ranges in a reaction zone for a predefined time;
    cooling the feed mixture to a temperature in the range 25-200° C. and
    expanding the feed mixture to a pressure in the range of 1-70 bar, thereby causing the carbonaceous material to be converted to a liquid hydrocarbon product; and
    separating from the converted feed mixture a fraction comprising liquid hydrocarbon product;
  where according to the preparation method the system is filled with fluid different from the feed mixture, while the system being at a temperature and a pressure below the operational temperature and pressure, pressurising the system to at least 90% of the operational pressure and heating the fluid to the operational conditions at a predetermined heating and pressurisation rate in the range 1 to 10° C./min, where the pressure is constantly kept at a level above the saturation pressure for the fluid at a given temperature, and where upon reaching the operational temperature and pressure the fluid inflow to the pressurisation is terminated and the feed mixture inflow to the pressurisation is initiated.

By following the described method the operating conditions may be reached in a manner faster and more reliable than otherwise known. The apparatus will likewise reach the operating state in a manner where any harmful influence from not being at operational conditions during heating and pressurization are avoided. As a consequence the availability of the apparatus and thereby the effective production has been improved by means of the invention.

The fluid used in start up procedure is different from feed mixture under normal operation conditions. The fluid often comprises water. Non limiting examples of preferred fluids include water, alcohols, oil or fraction of oil and mixtures thereof.

Advantageously the heating rate is within the the range 2 to 10° C./min, most preferably the heating cooling rate is in the range 3-8° C./min. By heating the fluid along the rates according to the preferred mode an efficient heating will be achieved and besides this the possible harmful effect of thermal stress is significantly avoided.

Advantageously the pressure during the conversion is at least 150 bars such as at least 180 bars, preferably said pressure is at least 200 bars such as 221 bars and more preferably said pressure during conversion is at least 250 bar such as at least 300 bars, and the temperature during the conversion is at least 300° C., such as between 300° C. and 450° C., preferably between 350° C. and 430° C., more preferred between 370° C. and 430° C. and most preferred between 400° C. and 420° C.

Preferably the heating time is in the range 30 minutes to 12 hours, such as in the range 1 hour to 8 hours, preferably in the range 1 hour to 6 hours and more preferably in the range 2 to 5 hours.

Advantageously the pressure is maintained at a pressure of at least 10 bars higher than corresponding saturation pressure such as at least 25 bars higher than the saturation pressure at the prevailing temperature in the process, preferably said pressure is maintained at least 50 bars higher than the saturation/boiling point pressure at the prevailing temperature such as at least 100 bars higher than the saturation/boiling point pressure at the prevailing temperature. By keeping the pressure higher as defined it is ensured that the the fluid is kept in a liquid or supercritical state (single phase), and hence influence from multi phase state such as e.g precipitation are avoided.

In a preferred embodiment the duration of said heating cycle corresponds to at least 3 exchanges of the volume in said high pressure high temperature part of the process such as at least 5 volume exchanges, preferably at least 10 volume exchanges such as at least 20 volume exchanges.

In a preferred embodiment a cleaning agent is added to the fluid during the heating phase in order to perform a combined heating and cleaning procedure, and hence saving further time.

Further according to the invention the objective is achieved through an apparatus for performing a method as described above, where the apparatus being adapted for continuous conversion of carbonaceous material contained in one or more feedstocks into a liquid hydrocarbon product, said carbonaceous material being in a feed mixture including said carbonaceous material and one or more fluids, said fluids including water, the apparatus comprising:

- at least one feed pump for feeding the feed mixture into the processing zone;
- a pressurization device adapted to pressurize the feed mixture to a pressure of 150-400 bar
- a heating device adapted to heat the pressurized feed mixture to a temperature of 300-450° C.
- a conversion device adapted to hold the pressurized and heated feed mixture for a conversion time of 10-40 minutes
- a cooling device adapted to cool the treated feed mixture to a temperature of 25-200° C.
- an expansion device adapted to reduce the pressure of the treated feed mixture to a pressure of 1-70 bar, and
- a separation device adapted to separate a liquid hydrocarbon product from the treated and successively cooled and expanded feed mixture;

where further, in order to perform the method for preparation as defined in any of the previous claims, valves are provided for closing of the inflow of feed mixture to the pressurization device and for opening the inflow of a fluid to the pressurization device, and where a control system is provided, with at least one pressure sensor and at least one temperature sensor for providing input to a central control unit and where the control unit provides control signals for the valves for closing and opening, respectively, and for the pressurization device and the heating device, to comply with the process according to the invention.

By means of configuring the apparatus in the manner defined the control means for performing the method according to the invention have been effectively incorporated.

Further embodiments and advantageous effects of the present invention are presented in the following description of preferred embodiments of the invention.

Throughout this document the terms "comprising" or "comprises" do not exclude other possible elements or steps. Also, the mentioning of references such as "a" or "an" etc. should not be construed as excluding a plurality.

DESCRIPTION OF PREFERRED A EMBODIMENT OF THE INVENTION

Pretreatment

Figure 1:
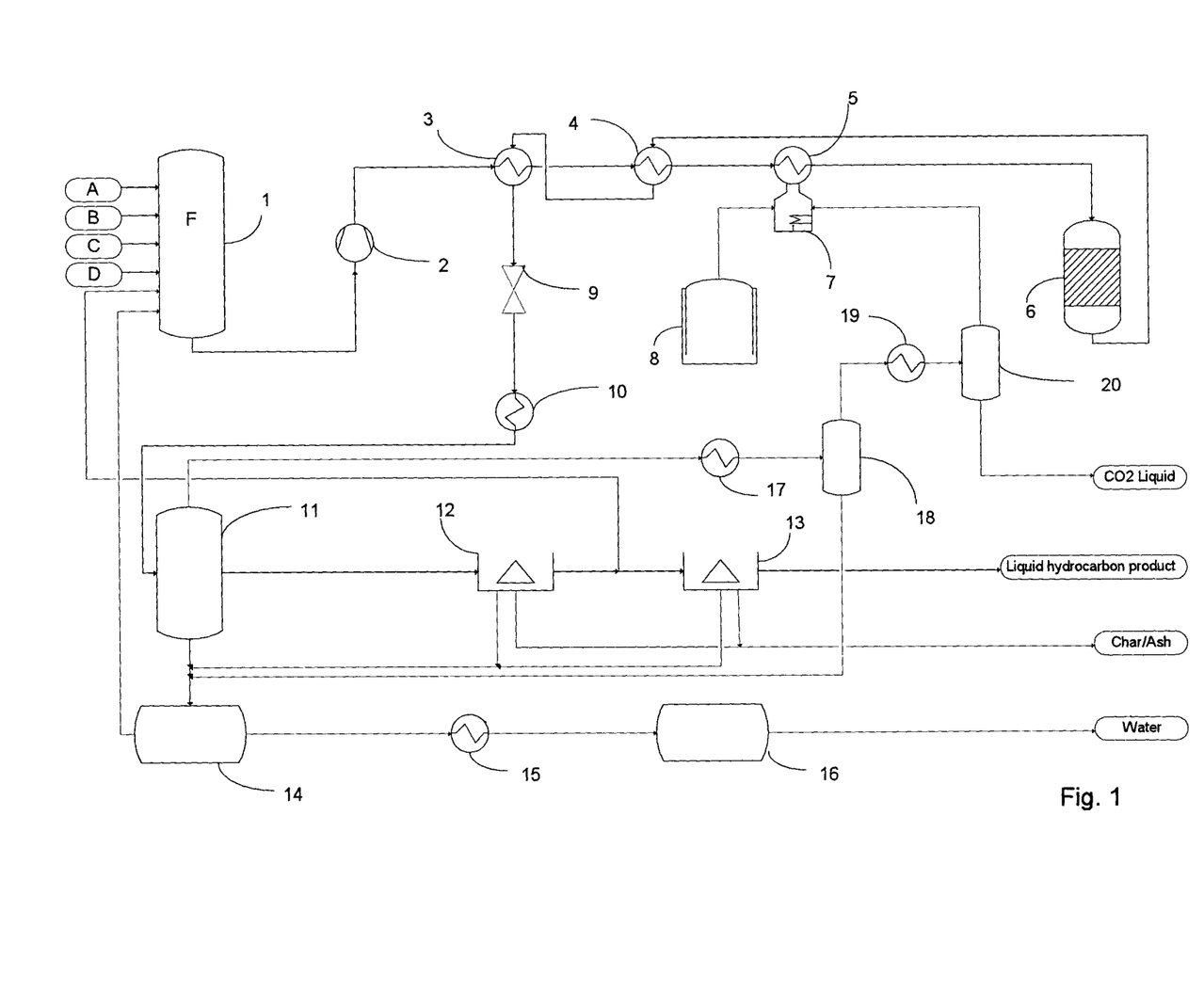
FIG. 1 shows a preferred embodiment of a continuous process according to the present invention.

Carbonaceous material contained in one or more input streams A,B are introduced into a pretreatment step in pretreatment device 1, where they are transformed into a homogeneous, pumpable feed mixture in the form of a slurry and/or paste F. This may be performed e.g. by introducing in situ produced liquid hydrocarbon compounds such as a recycle stream of the liquid hydrocarbon product produced or a fraction of the same as indicated by the fluid stream from the pipeline after the first separation and into the pretreatment device 1 and/or recovered liquid organic compounds and/or homogeneous catalysts from the water phase as indicated by the fluid stream from 14 into the pretreatment device 1. Depending on the concentration of the homogeneous catalysts such as potassium and/or sodium in the input stream(-s) make up catalysts C may also be introduced to adjust the catalyst concentration to the concentration according to the present invention. Said catalyst may according to a preferred embodiment of the present invention be added as a salt or be dissolved in a liquid e.g. water. Often said make up catalyst(s) C according to the present invention will be in an alkaline form such as in an hydroxide or carbonate form, and may besides make up of the homogeneous catalyst concentration further serve as a pH adjustment of the feed mixture F so as to obtain a pH of at least 7 during or after said conversion, preferably a pH in the range 8-12 and more preferably a pH in the range 8-11. In many embodiments according to the present invention, the pH of the feed mixture during and/or after said conversion of carbonaceous material contained in said feed mixture F is controlled by measuring the pH during and/or after said conversion and adjusting the pH in said feed handling 1 by addition of make-up catalyst and/or alternatively adding another base D to said feed handling 1.

Typically the weight ratio of said recycled stream(-s) comprising liquid organic compounds relative to said input streams being introduced into said feed handling according to the present invention is in the range 0.01 to 5.0, such as in the range such as in the range 0.1 to 2.0, preferably in the range 0.15 to 1.0 such as in the range 0.10 to 0.5, and even more preferably in the range 0.2-0.4. Besides introducing process advantages from a conversion point of view, the recovery and recycle of in situ produced liquid organic compounds to the pretreatment 1 enables preparation of a feed mixture comprising homogeneous pumpable slurry or paste F from the input streams as received and/or preparation of a feed mixture comprising a pumpable slurry or paste F having a higher dry matter content as no or less water and/or other solvent needs to be added to said pretreatment 1. It has further been found that presence of said liquid organic compounds during said pretreatment 1 introduces a stabilizing and/or dissolution effect that assists in homogenizing the feed mixture F e.g. by decreasing the viscosity of said feed mixture at a given dry solid content and temperature or allows for operation a higher maximum particle size and/or at higher dry matter contents and thereby results in an overall more economical and effective process e.g. less parasitic energy losses and more oil produced.

The pretreatment 1 may according to a preferred embodiment of the present invention further comprise providing a feed mixture F with a maximum particle size of maximum of 30 mm such as a particle size of maximum 15 mm, preferably said feed mixture provided has a particle size of maximum 5 mm such as a particle size of maximum 2 mm, more preferably the maximum particle size in said feed mixture is in the range 0.01 to 1.5 mm such as 0.1 to 1.0 mm. Said providing may comprise controlling the maximum particle size particle size of the input materials e.g. by dividing said input materials A, B by a sieving operation and/or one or more crushing and/or grinding and/or milling and/or cutting operations (not shown) and/or by dividing said feed mixture F before being withdrawn from said pretreatment to the pressurization step.

The pretreatment 1 according to a preferred embodiment according to the present invention further comprises means for thoroughly mixing and transforming said input stream(-s) and fluid streams A, B, C, D into a homogeneous slurry or paste. Said mixer may according to the present invention be a stirred vessel equipped with means for efficiently mixing and homogenizing viscous materials such as a planetary mixer, Kneader or Banbury mixer. Other preferred means for thoroughly mixing and homogenizing said input and fluid streams to a feed mixture according to the present invention include inline mixers. Such inline mixers may further introduce a cutting and/or scissoring and/or self-cleaning action. The mixer is preferably further equipped with means for heating said feed mixture to a temperature in the range 50 to 200° C., preferably in the range 80 to 180° C. and more preferably in the range 90 to 160° C. at sufficient pressure to avoid boiling such as a pressure in the range 1-20 bars, preferably in the range 1-12 bars. Preferred means for heating said feed mixture during the pretreatment according to the present invention include a heating jacket not shown). In a preferred embodiment the heat for preheating said feed mixture F in the pretreatment 1 is obtained from the cooling of the converted carbonaceous material comprising liquid hydrocarbon product e.g. by heat exchange with this process stream. Hereby the energy efficiency of the process may be further enhanced.

According a preferred embodiment of the present invention, the mixer may further be equipped with a re-circulation loop (not shown), where material is withdrawn from said mixer and at least partly re-circulated in an internal or external loop and re-introduced into said pretreatment so as to control the residence time in said pretreatment or feed handling to a predefined time. Preferred residence times in said pretreatment step 1 are according to the present invention in the range 1 minute to 24 hours such as in the range 5 minutes to 12 hours. Preferably the residence time is in the range 5 minutes to 6 hours, more preferably in the range 10 minutes to 3 hours.

Typically the dry matter content according to the present invention is in the range 20 to 70% by weight, preferably in the range 25 to 60% and more preferably in the range 30 to 50% by weight.

The process according to the present invention requires water to be present in said feed mixture. Typically the water content in said feed mixture is at least 30% by weight in the range 30 to 80% by weight and preferably in the range 30 to 70%.

The mechanical and/or thermal and/or chemical pulping of the input materials obtained in said pretreatment 1 according to a preferred embodiment of the present invention enables the production of a homogeneous pumpable feed mixture F premixed with additives for performing a process according to the present invention and having a high dry matter content at a viscosity processable by a process according to the present invention. The feed mixture according to the present invention results in a more effective and economical process than in the prior art e.g. less parasitic energy losses and higher oil yields.

Conversion

The feed mixture F is being withdrawn from said feed handling 1 and transferred to the pressurization pump 2, preferably by a positive displacement pump such as an auger or lobe pump. According to the present invention said pressurization to the desired reaction pressure is essentially performed before heating from entry temperature from the pretreatment 1 to the reaction temperature is initiated. Preferred pumps for said pressurization according to the present invention include rotary lobe pumps in a series arrangement, single or double acting piston pumps, hose diaphragm piston pumps.

The pressurization is preferably performed prior to heating and the feed mixture is generally pressurized to a sufficiently high to maintain the feed mixture and/or converted feed mixture in a liquid and/or supercritical state during said heating and conversion i.e. the feed mixture is pressurized to a pressure of at least the saturation pressurization pressure at the prevailing temperature in the process.

Typically the feed mixture may be pressurized to an operating pressure during said heating and conversion of at least 150 bars such as 180 bars, preferably said operating pressure is at least 200 bars such as 221 bars and more preferably said operating pressure during conversion is at least 250 bar such as at least 300 bars.

The pressurized feed mixture is subsequently heated to a reaction temperature in the range 300 to 450° C. such as in the range 350 to 430° C., preferably in the range 370 to 430° C. such as in the range 385 to 430° C., more preferred in the range 390 to 430° C. such as in the range 400 to 420° C.

According to a preferred embodiment of the present invention said heating is performed in one or more heat exchangers 3, 4, 5. Preferably said heating is at least partly performed by recovery of heat from one or more process streams. In the preferred embodiment shown in the figure, heat is recovered from the hot product stream, from the reactor 6 and transferred to the pressurized feed mixture by direct heat exchange in the first heat exchangers 3 and 4. Typically the feed mixture F is heated from entry temperature to a temperature in the 180-250° C. in the first heat exchanger 3, and to a temperature in the range 300-390° C. in the second heat exchanger 4. In an optional embodiment said heat recovery may be performed by indirect heat exchange with a heat transfer medium such as steam, hot oil or a molten salt. By said heat recovery it is obtained that the process becomes very energy efficient as most of the heat required is recovered.

The heat exchangers 3 and 4 may optionally be combined into one heat exchanger. However, as the properties of the feed mixture e.g. the viscosity changes significantly during said heating, it is typically preferred to divide said heating into two or more heat exchangers. This further has the advantage that different materials of construction may be used in the heat exchangers e.g. a lower alloyed material may be used in the first heat exchanger 3. Further according to a preferred embodiment of the present invention said heat exchangers are designed to provide a relatively high heating rate in the temperature range up to 300° C. or thereabout. Typically the heating rate in the range from 140 to 300° C. is at least 50° C./min, preferably 75° C./min, more preferred 100° C./min and even more preferred 150° C./min. In combination with the characteristics of the feed mixture according to the present invention it is hereby obtained that undesired side reactions to char and tar is minimized, and that the yield of desired liquid hydrocarbon product is maximized.

The feed mixture F is further heated to reaction temperature in the heat exchanger 5. Said heater may be a fired heater 7 as shown in the figure e.g. a heater fueled by e.g. natural gas, oil or other suitable fuel 8. Preferably said fired heater is at least partly fueled by a product produced by the process according to the present invention such as gas produced by the process as shown in the figure. Other potential products produced by the process for at least partly fueling said fired heater may include char and liquid hydrocarbon product. By at least partly fueling said fired heater by a product produced the parasitic energy loss is reduced and the energy efficiency is increased. Hereby a process that uses less consumables, are more economical more energy efficient and having a smaller environmental and/or $CO_2$ footprint is obtained.

Alternative embodiments of the further heating to the reaction temperature according to the present invention include a fired heater with indirect heating e.g. where heat from the combustion fuel(-s) in said furnace or burner is first transferred to another heat transfer medium such as steam, hot oil or molten salt before heat exchange with said partly heated feed stream.

Subsequent to heating to reaction temperature said pressurized and heated feed mixture F is maintained at the desired pressure and temperature in a reaction zone 6 for a predefined time. The feed characteristics and/or the combination of pressure and temperature according to the present invention generally allow for shorter reaction times and/or a more reacted liquid hydrocarbon product than in the prior art without sacrificing the yield and/or quality of the desired product. The predefined time in said reaction zone may according to an embodiment of the present invention be in the range 1 to 60 minutes such as 5 to 45 minutes, preferably said predefined time in said reaction zone is in the range 10 to 40 minutes such as in the range 10 to 30 minutes, more preferred in the range 10 to 25 minutes such as 10 to 20 minutes.

A reaction zone 6 according to the present invention advantageously comprises one or more reactors, preferably vertically oriented, wherein said feed mixture is fed to the top of said reactor(-s) in same direction as the gravity and withdrawn from the bottom. Preferably said conversion reactors further comprise a conically shaped inlet for introducing said feed mixture in the top and a conically shaped outlet for withdrawing said converted feed mixture F in the bottom. Advantageously said conically shaped inlet has an angle of the walls of said conically shaped inlet to the centerline of said reactor below 60°, and said conically shaped outlet has an angle of the walls of said conically shaped outlet to the centerline of said reactor below 30°.

Further the diameter of inlet and outlet of reactor 6 to the maximum diameter of the reactor are preferably selected so as to obtain a minimum ratio of the maximum average velocity in inlet/outlet to the minimum average velocity in the reactor of at least 4, preferably the ratio of the maximum average velocity in the inlet/outlet to the minimum average velocity in the reactor are selected so as to obtain a ratio of velocities at least 16, more preferred the maximum average velocity in the inlet/outlet to the minimum average velocity in the reactor are selected so as to obtain a velocity ratio of at least 25 such as a a velocity ratio of at least 50.

Hereby an advantageous reactor system is provided that is less sensitive to clogging due to sedimentation of suspended particles, and is more compact and economically attractive than in the prior art. Further the controlled decrease and increase of velocities in the inlet and outlet may allow for a more efficient use of the reactor volume.

Cooling and Expanding

The outlet stream from the reactor 6 comprising liquid hydrocarbon product from said converted carbonaceous material is subsequently cooled by heat exchange with the incoming feed mixture F in the heat exchangers 3,4. Often it is cooled to a temperature in the range 240-300° C. in the heat exchanger 4 and further to a temperature in the range 100-200° C. in the heat exchanger 3 and optionally by heat exchange in said pretreatment/or feed handling step as described above, before expanding the converted feed mixture containing liquid hydrocarbon product to a pressure in the range 1-70 bars in one or more expansion steps 9. A further cooler 10 may be provided.

Separation

The mixture from said expanding containing liquid hydrocarbon product is subsequently lead to separation. Said separation may according to the present invention comprise means 11 for separating gas from said mixture as shown in the figure. Said separation means may comprise a flash separator or degasser 11, wherein gas is withdrawn from the top. According to an embodiment of the present invention said gas may be used to produce heat for heating in the process to the process as shown in the figure and further described above. The gas may optionally be cooled to condense compounds such as e.g. water prior to said use to produce heat for heating in the process.

The gas separating means 11 may further provide at least a coarse separation of the degassed mixture into a liquid hydrocarbon rich stream and residual water rich stream e.g. by gravimetric separation. The water rich stream comprising water soluble organics, suspended particles and dissolved salts may be at least partly withdrawn from said gravimetric separator, and fed to a recovery unit, optionally after further separation by filtering and/or centrifugation (not shown) to remove suspended particles.

The degassed mixture or optionally the liquid hydrocarbon rich stream, is withdrawn from said gas separating means 11, and may be further separated by centrifugation 12,13. Said centrifugation 12,13 preferably comprises one or more 3-phase centrifuges such as one or more high speed disc bowl centrifuges and/or one or more decanter centrifuges 12,13, separating the degassed mixture into a water phase containing water soluble organics and dissolved salts, an oil phase and a sludge phase comprising suspended particles. The first centrifuge 12 is preferably a concentrator designed for producing a water phase substantially free of liquid hydrocarbon product, a liquid hydrocarbon product comprising some water and a sludge phase comprising suspended ash and/or char particles. The water phase is fed to the recovery unit 14. The liquid hydrocarbon product is fed to the second centrifuge 13 for further separation of water and ash and/or char. Preferably the liquid hydrocarbon product after said first centrifuge is being divided prior to entering said second centrifuge 13. Preferably a fraction of said liquid hydrocarbon product produced is recycled to said pretreatment step 1.

The second centrifuge 13 is preferably a high speed disc bowl centrifuge designed as an oil purifier i.e. to produce an liquid hydrocarbon product substantially free of water. Water from the second centrifuge 13 is preferably mixed with water from the first centrifuge 12 and fed to the recovery unit 14. Similarly ash and/or char from the second centrifuge 13 is mixed with ash and/or char from the first centrifugation 12, dried (not shown) and send to storage.

For effective separation the centrifuges 12,13 according to an embodiment of the present invention is preferably operated at temperature in the range 50 to 200° C. such as a temperature in the range 70 to 150° C. The pressure during said separation by centrifugation is maintained at a pressure sufficiently high to avoid boiling at the prevailing temperature e.g. a pressure of up to 15 bar, preferably a pressure up to 10 bar, more preferred a pressure up to 5 bar.

Recovery

The water phases from the gas separating means 11, centrifuges 12 and 13 are fed to a recovery device 14, where liquid organic compounds and/or homogeneous catalysts are recovered in a concentrated form, and recycled to into the pretreatment device 1.

Preferably said recovery device 14, comprises an evaporation step, wherein said water is evaporated from said combined water phases, and thereby providing a distillate and a concentrate. The combined water phases may be preheated to a temperature of e.g. 70-95° C. before entering into said evaporator. The heat for said preheating is preferably provided by heat recovery from a process stream and/or from the outgoing distillate stream before entering into the evaporator.

In the evaporator, water is evaporated from said mixture comprising water soluble organics and dissolved salts at a temperature of 100 to 105° C. A preferred embodiment of said evaporator according to the present invention include increasing the condensation temperature of said evaporated water by increasing the pressure by blower, compressor (Mechanical Vapor Recompression) or a steam jet ejector (Thermal Vapor Recompression) or a combination thereof. Thereby the evaporated water vapor can be used as a heating medium for the evaporation in said evaporator, and said evaporator becomes very energy efficient as the latent heat of evaporation do not need to be supplied to said evaporation step. Preferably said evaporated fraction passes a demister and/or foam breaker prior to said vapor recompression. Said evaporator may advantageously be divided into two or more steps operating at a decreasing pressure and temperature each heated with the evaporated vapor from the same vapor (in the case of vapor recompression) or the vapor from the foregoing step to minimize or further minimize the heat required for said evaporation.

Said evaporator may further comprise condensing said evaporated vapor in to or condensation steps, where the condensation temperatures in said condensation steps are selected so as to obtain a fractionation of the evaporated fraction i.e. a fraction comprising water and eventually higher boiling compounds, and a fraction where compounds having a boiling point temperature lower than water are concentrated. It should be noted that said condensers according to the present invention may comprise heat exchangers where the media to be concentrated are evaporated on the other side, but in general said evaporation step according to the present invention comprises at least one additional condenser compared to the number of evaporation steps. The fraction comprising evaporated water ("distillate") may further be cooled to a temperature suitable for discharge in a cooler, 15. Hereby, it is obtained that said evaporator besides recovering said liquid organic compounds and/or homogenous catalysts also cleans and purifies the water phase in an efficient manner, and can produces a water phase that may be reused or discharged to recipient. Optionally the "distillate" may be subjected to one or more polishing steps, 16. Said polishing steps may include an absorber and/or adsorber and/or a coalescing step and/or membrane system and/or a biological treatment system such as bioreactor.

The fraction being concentrated with compounds having a boiling point lower than water may according to a preferred embodiment be mixed with the concentrate from said evaporator, and recycled to the pretreatment step 1.

Further the preferred embodiment of the process according to the present invention, disclose that $CO_2$ is recovered from the gas produced by the process.

A carbonaceous material from one or more feedstock is provided as a feed mixture according to the present invention and converted into a liquid hydrocarbon product in a continuous process by pressurizing the feed mixture to a pressure in the range 150-400 bar, and subsequently heating the feed mixture to a temperature in the range 300 to 450° C., and maintaining the feed mixture in the desired pressure and temperature range in a reaction zone for a predefined time. Subsequently the mixture containing converted carbonaceous material, is cooled and expanded in one or more cooling and expansion steps to a temperature in the range 25-200° C., and a pressure in the range 1 to 70 bar.

The converted feed mixture is at least partly expanded in at least one flash separation step 11, wherein the converted feed mixture is separated into a gas phase and a liquid phase. The gas typically contains 60 to 95+% $CO_2$ by weight with the remainder being hydrogen, $C_1$-$C_4$ hydrocarbons and water. The gas is is withdrawn from the top of the flash separator, and $CO_2$ is recovered from said gas phase.

It should be understood that the cooling and expanding may comprise a series of flash separators operating at different pressures and temperatures e.g. a first flash separator may be operating at a temperature and pressure close to the reaction temperature and pressure and may result in a gas phase and liquid phase. Either phase may be further cooled, expanded and separated into further gas and liquid phases. According to an embodiment of the present invention $CO_2$ is recovered from said gas phase or combination of gases by cooling and expanding said gas phase under pressure to a final pressure below the critical pressure of $CO_2$ of 74 bar such as a pressure in the in the range 50 to 70 bar, and a final temperature below the critical temperature of $CO_2$ of 31° C. in one or more steps so as to condense and recover $CO_2$ as liquid $CO_2$.

As shown in FIG. 1 a preferred embodiment includes a flash separator or degasser 11 that separates said converted feed mixture into a gas phase comprising a substantial amount of $CO_2$ and a liquid phase. The flash separator or degasser is preferably operated at a pressure of 50-70 bar and a temperature in the range 100 to 200° C. The gas may withdrawn from the top and cooled to a temperature in the range 35 to 80° C. such as a temperature in the range in the range 35 to 50° C. in a first condenser 17, whereby a first condensate comprising water and/or other condensables such as methanol, ethanol and/or acetone are produced. The condensate is separated from the gas in the splitter 18, and preferably fed to the recovery unit for concentration and purification. The gas phase separated from said splitter 18, is further cooled to a temperature below the critical point of $CO_2$ of 31° C. in the second condenser 19. Preferably said gas exiting the first splitter is cooled to a temperature in the range 12-30° C. such as a temperature in the range 15-25° C., whereby $CO_2$ is condensed. $CO_2$ condensed by the cooling in the second condenser is separated from the residual gas in the second splitter 20. The liquid $CO_2$ recovered is fed to a storage tank. The liquid $CO_2$ produced may be used for production of algae or enhanced oil recovery etc. The residual gas may have a high calorific value and a high hydrogen content after said separation. According to the present invention, the calorific value of said residual gas may be above 20 MJ/kg such as above 25 MJ/kg, preferably said residual gas may have a calorific value above 30 MJ/kg such as above 35 MJ/kg, more preferred said gas may have a calorific value above 40 MJ/kg. The residual gas produced may according to the present invention be used for at least partly producing heat for heating of the process.

The hydrogen concentration in said residual gas may be more than 30% by volume such as a hydrogen concentration of more than 35% by volume, preferably the hydrogen concentration in said residual gas is above 40% by volume. The hydrogen rich residual gas may in another embodiment according to the present invention be used as a hydrogen source in an upgrading process for upgrading said liquid hydrocarbon as further described in relation to the following figures.

Figure 2:
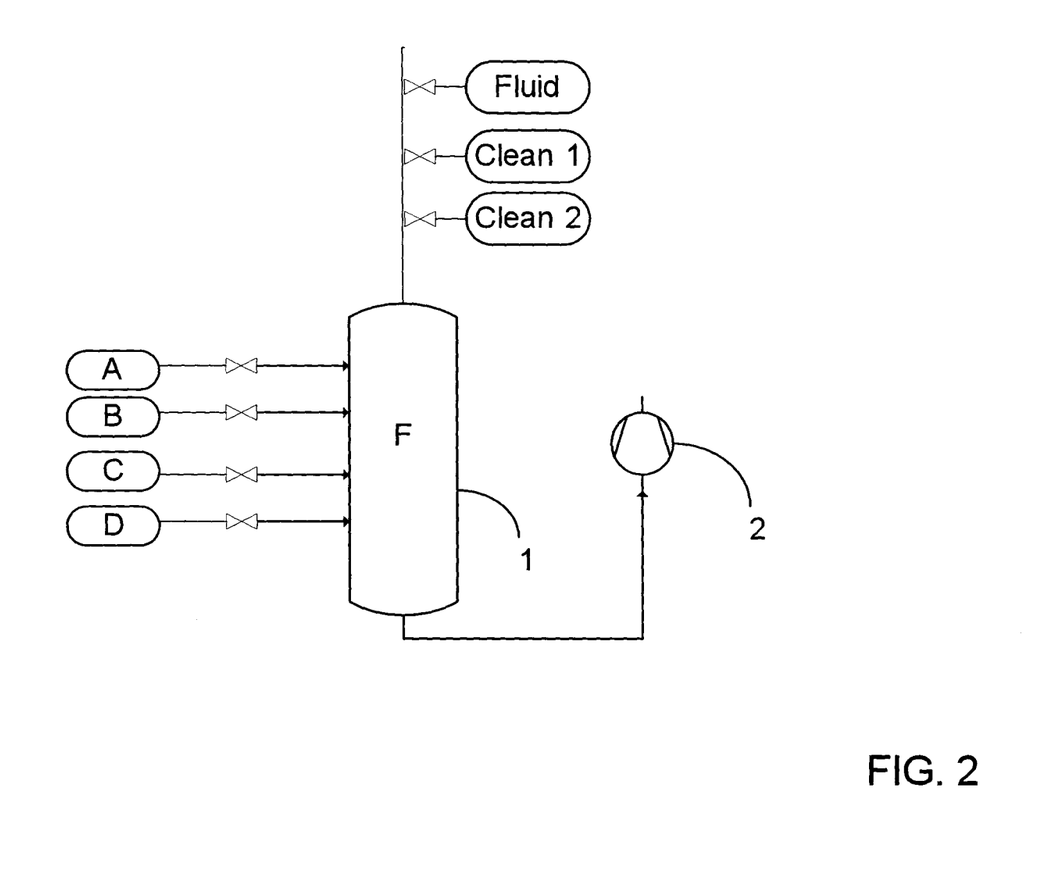
FIG. 2 shows a preferred embodiment of a valve arrangement for the process plant of FIG. 1.

From FIG. 2 a part of the apparatus described in FIG. 1 is shown in more detail. It appears from FIG. 2 that apart from the inflow systems for the production scenario, i.e. the feed mixture, the catalyst and the base, a further number of inflows (fluid, clean1 and clean2) have been provided. The further inflows include fluid, and two different cleaning agent inflows. Further may be provided. All inflows are controllable through valve arrangements 32,33,34, and all valves are controllable through a control system to be described in connection with FIG. 3.

The fluid used in start up procedure is different from feed mixture under normal operation conditions. The fluid often comprises water. Non limiting examples of preferred fluids include water, alcohols, oil or fraction of oil and mixtures thereof.

The heating is characterized by a substantial amount of heat added to said, during operation conditions, high pressure high temperature reaction zone being carried/transferred by said fluid.

The pressure during start up/shut down is according to the present invention maintained at a value higher than the corresponding saturation pressure at the prevailing temperature so to maintain the fluid used during heat up on a liquid form.

Hence according to a preferred embodiment of the present invention the pressure is maintained at a pressure of at 10 bars higher than corresponding saturation pressure such as at least 25 bars higher than the saturation pressure at the prevailing temperature in the process, preferably said pressure is maintained at least 50 bars higher than the saturation/boiling point pressure at the prevailing temperature such as at least 100 bars higher than the saturation/boiling point pressure at the prevailing temperature.

During a start up procedure the duration of said heating cycle corresponds to at least 3 exchanges of the volume in said high pressure high temperature part of the process such as at least 15 volume exchanges, preferably at least 10 volume exchanges such as at least 20 volume exchanges.

Figure 3:
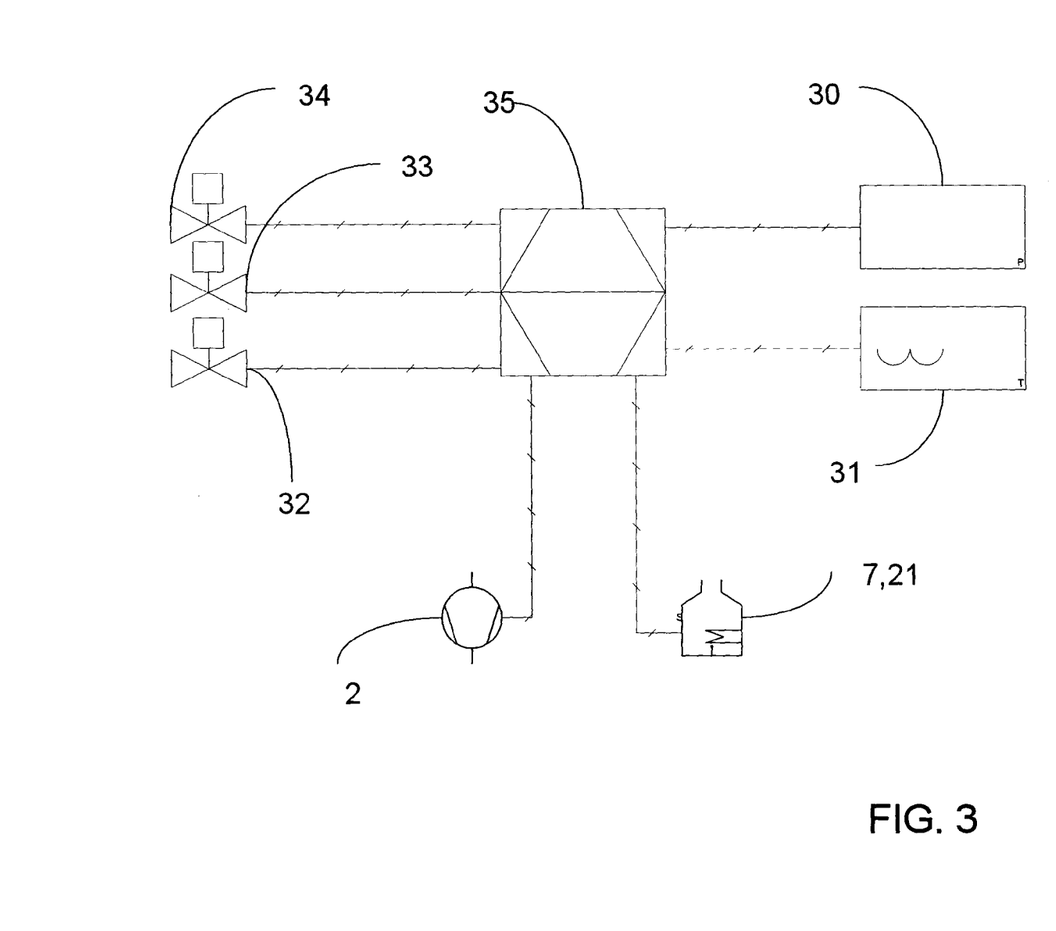
FIG. 3 shows a schematic representation of an apparatus according to the invention with a control system for controlling the process according to the invention.

From FIG. 3 a schematic control system appears. The control system comprises at least one, preferably more, temperature sensor(s) 31 and at least one, preferably more, pressure sensor(s) 30. The temperature and pressure sensors 30,31 provide an input to a central control unit 35, capable of providing control signals to valves 32,33,34, heater(s) 7,21 and compressor(s) 2. The control signals provided follows the specifications of the process according to the invention and may be calculated based on a suitable formula or may be based on values from look up tables specifying the corresponding values of input and output.

The control system is part of the apparatus according to the invention.

Figure 4:
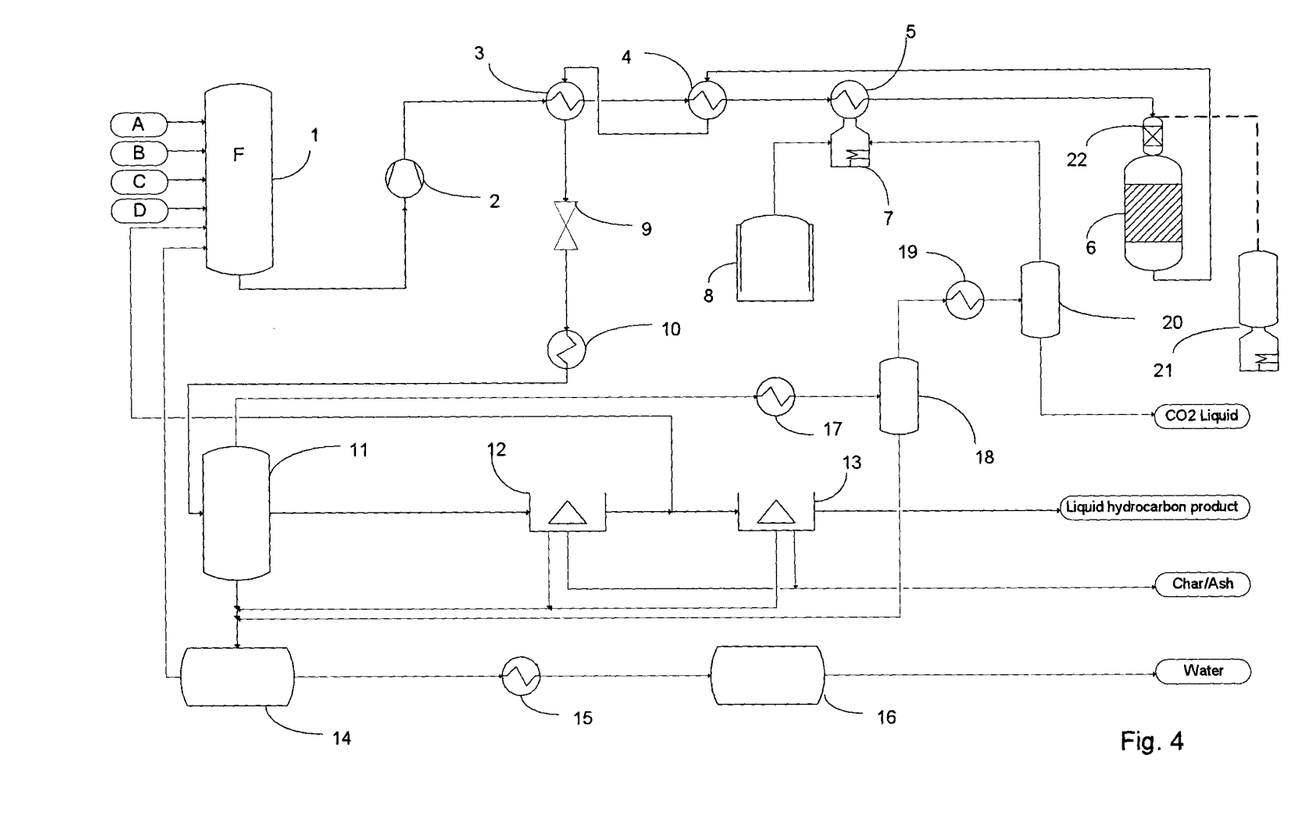
FIG. 4 schematically show an embodiment where heating by supercritical fluid injection is performed.

FIG. 4 shows another preferred embodiment of the invention, where part of the heating is performed by direct heating by injection of a super heated fluid such as a supercritical fluid instead of or as an addition to heat addition by indirect heating as shown in FIG. 1. The super heated or supercritical fluid is introduced into the feedstock/fluid in a mixing zone 22. subsequent to the second heater 5. The mixing zone 22 may according to the present invention constitute an integral part of the reactor 6. The super heated or supercritical fluid being introduced into said mixing may comprise super heated supercritical water at a pressure and temperature higher than the desired reaction temperature for said conversion such as a pressure above 300 bar and a temperature above 450° C.

The super heated or supercritical water may be provided by a supercritical boiler 21, which may optionally be at least partly fuelled by gas exiting the separator 20.

In order to start up a conversion process a method is provided for preparing a process system for performing such process for continuously converting carbonaceous material contained in one or more feedstocks into a liquid hydrocarbon product, said feedstocks including the carbonaceous material being in a feed mixture including one or more fluids, said fluids including water, the process comprising:
converting at least part of the carbonaceous material by:
pressurising the feed mixture to an operational pressure in the range 221-400 bar
heating the feed mixture to an operational temperature in the range 300-450° C., and
maintaining said pressurized and heated feed mixture in the desired pressure and temperature ranges in a reaction zone for a predefined time;
cooling the feed mixture to a temperature in the range 25-200° C. and
expanding the feed mixture to a pressure in the range of 1-70 bar, thereby causing the carbonaceous material to be converted to a liquid hydrocarbon product; and
separating from the converted feed mixture a fraction comprising liquid hydrocarbon product;
where the preparation method comprises, filling the system with a fluid different from the feed mixture while the system being at a temperature and a pressure below the operational temperature and pressure, and subsequently pressurizing the fluid to at least 90% of the operational pressure and further increasing the temperature at a predetermined heating rate in the range 1 to 10° C./min, where the pressure is constantly kept at a level above the saturation pressure for the fluid at a given temperature, and
where upon reaching the operational temperature and pressure the fluid inflow to the pressurisation is terminated and the feed mixture inflow to the pressurisation is initiated.

Preferably the heating rate is 2 to 10° C./min, most preferably the heating rate is in the range 3-8° C./min. Preferably the pressure is at least 150 bars such as at least 180 bars, preferably said pressure is at least 200 bars such as 221 bars and more preferably said pressure during conversion is at least 250 bar such as at least 300 bars. Preferably the temperature during the conversion is at least 300° C., such as between 300° C. and 450° C., preferably between 350° C. and 430° C., more preferred between 370° C. and 430° C. and most preferred between 400° C. and 420° C.

Preferably the heating time is in the range 30 minutes to 12 hours, such as in the range 1 hour to 8 hours, preferably in the range 1 hour to 6 hours and more preferably in the range 2 to 5 hours. Preferably the pressure is maintained at a pressure of at 10 bars higher than corresponding saturation pressure such as at least 25 bars higher than the saturation pressure at the prevailing temperature in the process, preferably said pressure is maintained at least 50 bars higher than the saturation/boiling point pressure at the prevailing temperature such as at least 100 bars higher than the saturation/boiling point pressure at the prevailing temperature. Preferably the duration of said heating cycle corresponds to at least 3 exchanges of the volume in said high pressure high temperature part of the process such as at least 5 volume exchanges, preferably at least 10 volume exchanges such as at least 20 volume exchanges. Advantageously a cleaning agent is added to the fluid during the heating phase in order to perform a combined heating and cleaning phase. The fluid(-s) used in the preparation method comprises water, alcohol, oil, acetic acid, an alkaline solution such as sodium hydroxide, potassium hydroxide, ammonia or trisodium phosphate, or pyridine. The fluid(-s) used in the preparation method may comprise deionized water, e.g. deionized water, and at least one other fluid.

A method is provided for shutting down a process system performing a process for continuously converting carbonaceous material contained in one or more feedstocks into a liquid hydrocarbon product, said feedstocks including the carbonaceous material being in a feed mixture including one or more fluids, said fluids including water, the process comprising:
  converting at least part of the carbonaceous material by:
    pressurising the feed mixture to an operational pressure in the range 150-400 bar
    heating the feed mixture to an operational temperature in the range 300-450° C., and
    maintaining said pressurized and heated feed mixture in the desired pressure and temperature ranges in a reaction zone for a predefined time;
    cooling the feed mixture to a temperature in the range 25-200° C. and
    expanding the feed mixture to a pressure in the range of 1-70 bar, thereby causing the carbonaceous material to be converted to a liquid hydrocarbon product; and
    separating from the converted feed mixture a fraction comprising liquid hydrocarbon product;
where according to the method, in a state of discontinued operation the inflow of feed mixture is terminated and the system is filled with a fluid; where the pressure and temperature is set to a predetermined desired level, where the temperature is altered to the predetermined lower level at a predetermined rate in the range 1 to 10° C./min and where the pressure during the temperature reduction is constantly kept at a level above the saturation pressure for the fluid at a given temperature.

Preferably the cooling rate is within the the range 2 to 10° C./min, most preferably the cooling rate is in the range 3-8° C./min.

Preferably the pressure is at least 150 bars such as at least 180 bars, preferably said pressure is at least 200 bars such as 221 bars and more preferably said pressure during conversion is at least 250 bar such as at least 300 bars. Preferably the temperature during the conversion is at least 300° C., such as between 300° C. and 450° C., preferably between 350° C. and 430° C., more preferred between 370° C. and 430° C. and preferably between 385° C. and 430° C., most preferred between 400° C. and 420° C. Preferably the cooling time is in the range 30 minutes to 12 hours, such as in the range 1 hour to 8 hours, preferably in the range 1 hour to 6 hours and more preferably in the range 2 to 5 hours. Preferably the pressure during cooling is maintained at a pressure of at 10 bars higher than corresponding saturation pressure such as at least 25 bars higher than the saturation pressure at the prevailing temperature in the process, preferably said pressure is maintained at least 50 bars higher than the saturation/boiling point pressure at the prevailing temperature such as at least 100 bars higher than the saturation/boiling point pressure at the prevailing temperature. Preferably the duration of said cooling cycle corresponds to at least 3 exchanges of the volume in said high pressure high temperature part of the process such as at least 5 volume exchanges, preferably at least 10 volume exchanges such as at least 20 volume exchanges. Upon reaching the desired predetermined temperature and pressure, the temperature and pressure are essentially maintained at that level. Afterwards the heating is terminated and the pressurisation is terminated and upon reaching essentially the pressure of the surroundings the fluid is drained from the system. The feed mixture may comprise liquid organic compounds at least partly produced by the process in a concentration of at least 1% by weight. Advantageously a cleaning agent is added to the fluid during the cooling phase in order to perform a combined heating and cleaning phase. The fluid(-s) used in the preparation method comprises water, alcohol, oil, acetic acid, an alkaline solution such as sodium hydroxide, potassium hydroxide, ammonia or trisodium phosphate, or pyridine. The fluid(-s) used in the preparation method comprises deionized water, e.g. deionized water, and at least one other fluid.

A cleaning method is provided for process equipment for carrying out a continuos process for converting carbonaceous material contained in one or more feedstocks into a liquid hydrocarbon product, said feedstocks including the carbonaceous material being in a feed mixture including one or more fluids, said fluids including water, the process comprising:
  converting at least part of the carbonaceous material by:
    pressurising the feed mixture to an operational pressure in the range 221-400 bar
    heating the feed mixture to an operational temperature in the range 300-450° C., and
    maintaining said pressurized and heated feed mixture in the desired pressure and temperature ranges in a reaction zone for a predefined time;
    cooling the feed mixture to a temperature in the range 25-200° C. and
    expanding the feed mixture to a pressure in the range of 1-70 bar, thereby causing the carbonaceous material to be converted to a liquid hydrocarbon product; and
    separating from the converted feed mixture a fraction comprising liquid hydrocarbon product;
where in a state of cleaning the pressure and temperature is set to a predetermined desired level;
where according to the method prior to the cleaning, the inflow of feed mixture is terminated and the system is filled with a fluid, where the temperature and the pressure are altered to the predetermined level at a predetermined rate and where the pressure is constantly kept at a level above the saturation pressure for the fluid at a given temperature, where the inflow of at least one cleaning fluid is initiated and the at least one cleaning fluid is circulated in the system for a predetermined time; where upon reaching the predetermined time for the cleaning fluid circulation, the temperature and pressure is altered to the operational pressure and temperature at a predetermined rate, where the pressure is constantly kept at a level above the saturation pressure for the fluid at a given temperature; and
where upon reaching the operational conditions the inflow of the fluid/cleaning fluid is terminated and the inflow of feed mixture is initiated.

Preferably the heating/cooling rate is within the the range 0.1 to 20° C./min such as in the range 0.5 to 15° C./min, preferably the heating/cooling rate is maintained in the range 1 to 10° C./min such as 2 to 10° C./min, most preferably the heating/cooling rate is in the range 3-8° C./min. Preferably the pressure during conversion is at least 150 bars such as at least 180 bars, preferably said pressure is at least 200 bars such as 221 bars and more preferably said pressure during conversion is at least 250 bar such as at least 300 bars. Preferably the temperature during the conversion is at least 300° C., such as between 300° C. and 450° C., preferably between 350° C. and 430° C., more preferred between 370° C. and 430° C. and most preferred between 400° C. and 420° C. Preferably the cooling time is in the range 30 minutes to 12 hours, such as in the range 1 hour to 8 hours, preferably in the range 1 hour to 6 hours and more preferably in the range 2 to 5 hours. Preferably the pressure during cooling is maintained at a pressure of at least 10 bars higher than corresponding saturation pressure, such as at least 25 bars higher than the saturation pressure at the prevailing temperature in the process, preferably said pressure is maintained at least 50 bars higher than the saturation/boiling point pressure at the prevailing temperature such as at least 100 bars higher than the saturation/boiling point pressure at the prevailing temperature. The duration of said cooling cycle corresponds to at least 3 exchanges of the volume in said high pressure high temperature part of the process such as at least 5 volume exchanges, preferably at least 10 volume exchanges such as at least 20 volume exchanges. Advantageously at least two cleaning fluids are used and where the first cleaning fluid is added at a higher temperature and the second is added at a lower temperature, where further advantageous the first cleaning fluid is added at a temperature between 300 and 500° C., and the second cleaning fluid is added at a temperature between 250 and 350° C. Preferably the second cleaning fluid is added at a temperature which are 5 to 100° C. such as 10 to 75° C. lower than the temperature for addition of said first cleaning fluid, preferably the second fluid is added at a temperature which are 20 to 60° C. such as 25 to 40° C. lower than the temperature for addition of said first cleaning fluid. Advantageously a cleaning agent is added to the fluid during the cooling/heating phase in order to perform a combined heating and cleaning phase. The fluid(-s) used in the preparation method comprises water, alcohol, oil, acetic acid, an alkaline solution such as sodium hydroxide, potassium hydroxide, ammonia or trisodium phosphate, or pyridine. The fluid(-s) used in the preparation method comprises deionized water, e.g. deionized water, and at least one other fluid.

The invention claimed is:

1. A method comprising:
   preparing a process system; and
   using the prepared process system, performing a process for continuously converting carbonaceous material contained in one or more feedstocks into a liquid hydrocarbon product, said feedstocks including the carbonaceous material being in a feed mixture including one or more fluids, said fluids including water,
   wherein the process for continuously converting carbonaceous material comprises:
      converting at least part of the carbonaceous material by:
         pressurising the feed mixture to an operational pressure in the range 221-400 bar,
         heating the feed mixture to an operational temperature in the range 300-450° C.,
         maintaining said pressurized and heated feed mixture in the desired pressure and temperature ranges in a reaction zone for a predefined time,
         cooling the feed mixture to a temperature in the range 25-200° C. and
         expanding the feed mixture to a pressure in the range of 1-70 bar, thereby causing the carbonaceous material to be converted to a liquid hydrocarbon product; and
      separating from the converted feed mixture a fraction comprising liquid hydrocarbon product, and
   wherein the preparing of the process system comprises:
      filling the process system with fluid different from the feed mixture while the system is at a temperature and a pressure below the operational temperature and the operational pressure, respectively;
      subsequently pressurizing the fluid to at least 90% of the operational pressure and further increasing the temperature at a predetermined heating rate in the range 1 to 10° C/min, while constantly keeping the pressure at a level at least 10 bars above a saturation pressure for the fluid at the prevailing temperature; and
      upon reaching the operational temperature and the operational pressure, terminating inflow of the fluid to a pressurisation component of the process system, and initiating inflow of the feed mixture to the pressurisation component of the process system.

2. A method according to claim 1, where the predetermined heating rate is preferably 2 to 10° C./min.

3. A method according to claim 1, where the pressure in the preparing of the process system is at least 150 bars such as at least 180 bars.

4. A method according to claim 1, where the temperature during the heating step of the conversion process is at least between 350° C.

5. A method according to claim 1, where the heating time is in the range 30 minutes to 12 hours.

6. A method according to claim 1, where the pressure in the preparing of the process system is maintained at a pressure of at 25 bars higher than the saturation pressure at the prevailing temperature.

7. A method according to claim 1, where, the duration of increasing the temperature at the predeteimined heating rate corresponds to at least 3 exchanges of the reactor volume in said high pressure high temperature part of the conversion process.

8. A method according to claim 1, where a cleaning agent is added to the fluid while increasing the temperature at the predetermined heating rate in order to perform a combined heating and cleaning phase.

9. A method according to claim 1, wherein said fluid(-s) used in the preparing of the process system comprises water, alcohol, oil, acetic acid, an alkaline solution such as sodium hydroxide, potassium hydroxide, ammonia or trisodium phosphate, or pyridine.

10. A method according to claim 1, wherein said fluid(-s) used in the preparing of the process system comprises deionized water.

11. A method according to claim 1, wherein said fluid(-s) used in the preparing of the process system comprises deionized water, and at least one other fluid.

12. A method according to claim 2, where the pressure in the preparing of the process system is at least 150 bars.

13. A method according to claim 2, where the temperature during the heating step of the conversion process is at least between 350° C.

14. A method according to claim 3, where the temperature during the heating step of the conversion process is at least between 350° C.

15. A method according to claim 2, where the heating time is in the range 30 minutes to 12 hours.

16. A method according to claim 3 where the heating time is in the range 30 minutes to 12 hours.

17. A method according to claim 4, where the heating time is in the range 30 minutes to 12 hours.

18. A method according to claim 2, where the pressure in the preparing of the process system is maintained at a pressure of at 25 bars higher than the saturation pressure at the prevailing temperature.

19. A method according to claim 3, where the pressure in the preparing of the process system is maintained at a pressure of at 25 bars higher than the saturation pressure at the prevailing temperature.

\* \* \* \* \*